US009409755B2

(12) United States Patent
Melton et al.

(10) Patent No.: US 9,409,755 B2
(45) Date of Patent: Aug. 9, 2016

(54) PLATFORM SAFETY ENCLOSURE

(71) Applicant: Sam Carbis Asset Management, LLC, Florence, SC (US)

(72) Inventors: Allan J. Melton, Timmonsville, SC (US); William S. Meacham, Myrtle Beach, SC (US); Matthew Elvington, Lake View, SC (US)

(73) Assignee: SAM CARBIS ASSET MANAGEMENT, LLC, Florence, SC (US)

( * ) Notice: Subject to any disclaimer, the term of this patent is extended or adjusted under 35 U.S.C. 154(b) by 28 days.

(21) Appl. No.: 14/295,676

(22) Filed: Jun. 4, 2014

(65) Prior Publication Data

US 2015/0034418 A1 Feb. 5, 2015

Related U.S. Application Data

(60) Provisional application No. 61/861,693, filed on Aug. 2, 2013.

(51) Int. Cl.
*B66F 17/00* (2006.01)
*B66F 11/04* (2006.01)

(52) U.S. Cl.
CPC .............. *B66F 17/006* (2013.01); *B66F 11/04* (2013.01); *B65G 2207/40* (2013.01)

(58) Field of Classification Search
CPC ....... B66F 11/04; B66F 11/006; E04G 27/00; E05F 1/105; B60R 3/005; E05C 17/00; E05C 17/02; E05C 17/44; E05C 17/52
USPC .................................................. 182/222, 223
See application file for complete search history.

(56) References Cited

U.S. PATENT DOCUMENTS

| | | | | | |
|---|---|---|---|---|---|
| 3,126,221 | A | * | 3/1964 | Grossmann | 292/341.18 |
| 3,216,373 | A | * | 11/1965 | Boone | 105/458 |
| 3,565,212 | A | * | 2/1971 | Johnson | 182/222 |
| 3,877,173 | A | * | 4/1975 | Lyons | A62C 2/24 49/7 |
| 4,280,243 | A | * | 7/1981 | Durrant | 14/71.1 |
| 4,776,429 | A | * | 10/1988 | Osborn | 182/144 |
| 4,897,961 | A | * | 2/1990 | Shine | E05B 63/127 49/141 |
| 5,042,612 | A | | 8/1991 | Bennett et al. | |
| 5,205,073 | A | * | 4/1993 | Lyons, Sr. | 49/386 |
| 5,746,289 | A | * | 5/1998 | Williams | 182/129 |
| 6,021,606 | A | * | 2/2000 | Kos | 49/386 |
| 6,830,127 | B2 | * | 12/2004 | Johnson | 182/113 |
| 7,140,467 | B2 | * | 11/2006 | Cook | B60R 3/005 182/141 |
| 7,216,741 | B2 | | 5/2007 | MacDonald et al. | |
| 7,226,091 | B2 | * | 6/2007 | Amy | E05C 17/14 16/82 |
| 8,403,109 | B2 | | 3/2013 | Bennett | |

(Continued)

*Primary Examiner* — Alvin Chin-Shue
(74) *Attorney, Agent, or Firm* — Dority & Manning, PA

(57) ABSTRACT

A safety enclosure for a platform comprises a support frame having a laterally extending inner portion, a laterally extending outer portion and a pair of transversely extending side portions defined at laterally opposing ends of the support frame. A handrail system extends laterally along the outer portion and transversely along the pair of side portions of the support frame. A floor portion extends laterally and transversely across the support frame and comprises at least one access panel. The access panel comprises a fixed end portion that is pivotally coupled to the support frame, and an opposing free end portion. A damper is coupled to the support frame and to the access panel so as to control a closure velocity of the access panel as it pivots from an open position to a closed position.

16 Claims, 5 Drawing Sheets

(56) References Cited

U.S. PATENT DOCUMENTS

| | | |
|---|---|---|
| 8,479,882 B2 | 7/2013 | DuBose |
| 8,479,884 B2 | 7/2013 | Mizell et al. |
| 8,622,173 B2 * | 1/2014 | Fuqua et al. .............. 182/63.1 |
| 9,021,743 B2 * | 5/2015 | Piermee ...................... 49/387 |
| 2005/0077107 A1 * | 4/2005 | Libert et al. ................ 182/119 |
| 2005/0241968 A1 * | 11/2005 | Hanson ................ B07C 3/008 206/277 |
| 2010/0032240 A1 * | 2/2010 | Rodriguez Fernandez ... 182/222 |

* cited by examiner

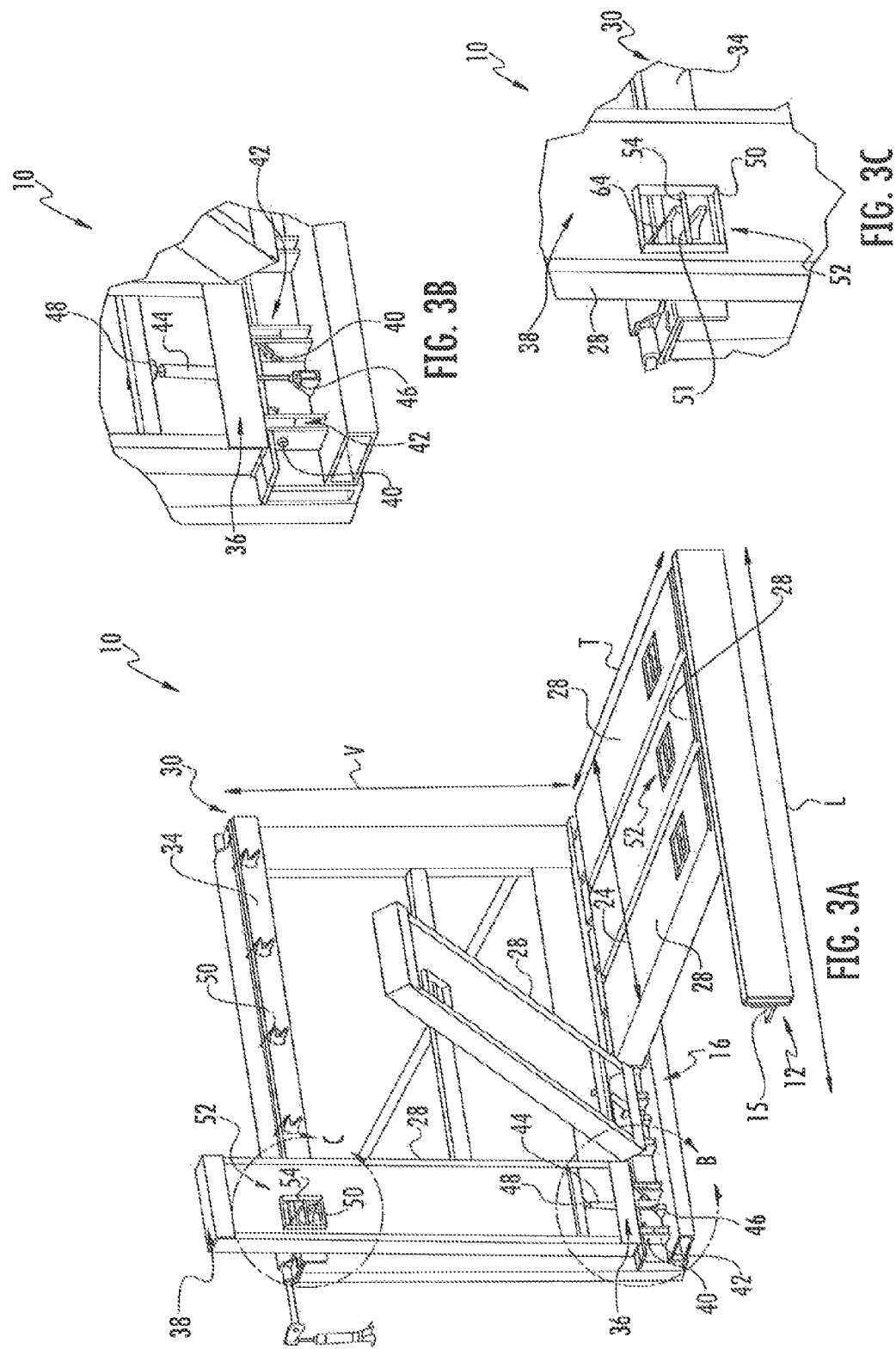

_A full and enabling disclosure of the present invention,_

PLATFORM SAFETY ENCLOSURE

CROSS REFERENCE TO RELATED APPLICATIONS

This application claims filing benefit of previously filed U.S. Provisional Patent application Ser. No. 61/861,693 having a filing date of Aug. 2, 2013, incorporated herein by reference in its entirety.

FIELD OF THE INVENTION

The present invention generally relates to a platform safety enclosure. More particularly, this invention relates to a platform safety enclosure having a floor access panel.

BACKGROUND OF THE INVENTION

In general, elevating or elevated platforms are used to access manways and/or other equipment such as valves and fittings that are positioned along a top portion of a container vessel, for example, such as a tank trailer, a tanker rail car and/or an isotainer. Typically, the top portions of these container vessels are rounded, thereby creating a potential fall hazard for operators working aloft. As a result, many elevating and/or elevated platforms include a platform safety enclosure.

A conventional platform safety enclosure includes a floor or platform, a series of handrails that extend around an outer perimeter of the floor and a gangway to allow for access onto the floor. The floor may include one or more access panels. Because the floor and access panels are weight-bearing elements, the floor and access panels typically are made of strong, rigid material such as steel. Though the access panels tend to be relatively heavy, they may be raised manually to an open position to provide for access to the manways and/or other equipment of the container vessel. Each access panel may be raised individually, and two or more access panels may be raised together simultaneously as a group of access panels. Unopened access panels and/or stationary panels provide a safe working/standing surface for the operators working on the platform.

In use, an operator raises the appropriate access panel and rests it along the handrail. A D-ring, chain and/or other device may be used to secure the access panel to the handrail, thereby preventing an accidental closure. Once the operator has completed his tasks, he must manually disconnect the access panel from the handrail and lower it back into position. This prevents a potentially dangerous open floor situation where an operator may inadvertently fall through an open access panel. This is particularly important when the platform is being used during low light and/or low visibility conditions.

One issue that arises with current platform safety enclosure designs occurs when operators occasionally forget to manually disconnect the access panels and to lower the access panel or panels back into a closed position, thereby potentially creating a fall and/or a trip hazard. Another issue occurs when the operator allows the access panel to free fall back into a closed position. Over time, this can cause significant damage to the access panels, thereby requiring costly repairs and extended down time for the elevating platform. Currently, repair and replacement often requires erection of expensive scaffolding which increases the time required to repair. Another concern arises when the opened access panel accidentally closes while an operator is positioned underneath, thereby potentially causing bodily injury.

BRIEF DESCRIPTION OF THE INVENTION

Aspects and advantages of the invention are set forth below in the following description, or may be obvious from the description, or may be learned through practice of the invention.

One embodiment of the present invention is a platform safety enclosure. The platform safety enclosure includes a support frame having a laterally extending inner portion, a laterally extending outer portion and a pair of transversely extending side portions disposed at laterally opposing ends of the support frame. A handrail system extends laterally along the outer portion and transversely along the pair of side portions. A floor portion is carried by and extends laterally and transversely across the support frame to at least partially define a walking and/or a working surface. The floor portion includes at least one access panel and desirably a plurality of access panels. Each access panel includes a fixed end portion and an opposing free end portion. The fixed end portion is pivotally coupled to the support frame, and the free end portion is moveable between the handrail and the floor portion. Each access panel can be raised separately and held in the raised and open position by a latch mechanism. Provision is made so that lowering of each access panel to the closed position can be effected by disengaging the latch mechanism. Each latch mechanism of each access panel can be disengaged manually and separately from each other latch mechanism of each other access panel. Moreover, provision is made so that all of the latch mechanisms of all of the access panels can be disengaged simultaneously, and such simultaneous disengagement of all of the latch mechanisms can be effected automatically and from a location that is remote from the platform safety enclosure. The platform safety enclosure further includes a damper for controlling a closure velocity of the access panel as it pivots from an open or raised position to a closed and/or a partially closed position. The damper includes a first end that is coupled to the support frame and a second end that is coupled to the access panel.

Another embodiment of the present invention is an elevating platform. The elevating platform includes a vertical lift mechanism and a platform safety enclosure that is carried by the vertical lift mechanism and desirably is configured as described above. The platform safety enclosure defines a walking and/or a working platform of the elevating platform. The platform safety enclosure includes a support frame that is connected to the vertical lift mechanism.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the specification, including reference to the accompanying figures, in which:

FIG. 3A illustrates a partial perspective view of components of the platform safety enclosure shown in FIG. 1, according to one embodiment of the present invention;

FIG. 3B illustrates an enlarged view of a portion of the platform safety enclosure as circumscribed by line B as shown in FIG. 3A, according to one embodiment of the present invention;

FIG. 3C illustrates an enlarged view of a portion of the platform safety enclosure as circumscribed by line C as shown in FIG. 3A, according to one embodiment of the present invention;

DETAILED DESCRIPTION OF THE INVENTION

Figure 1:
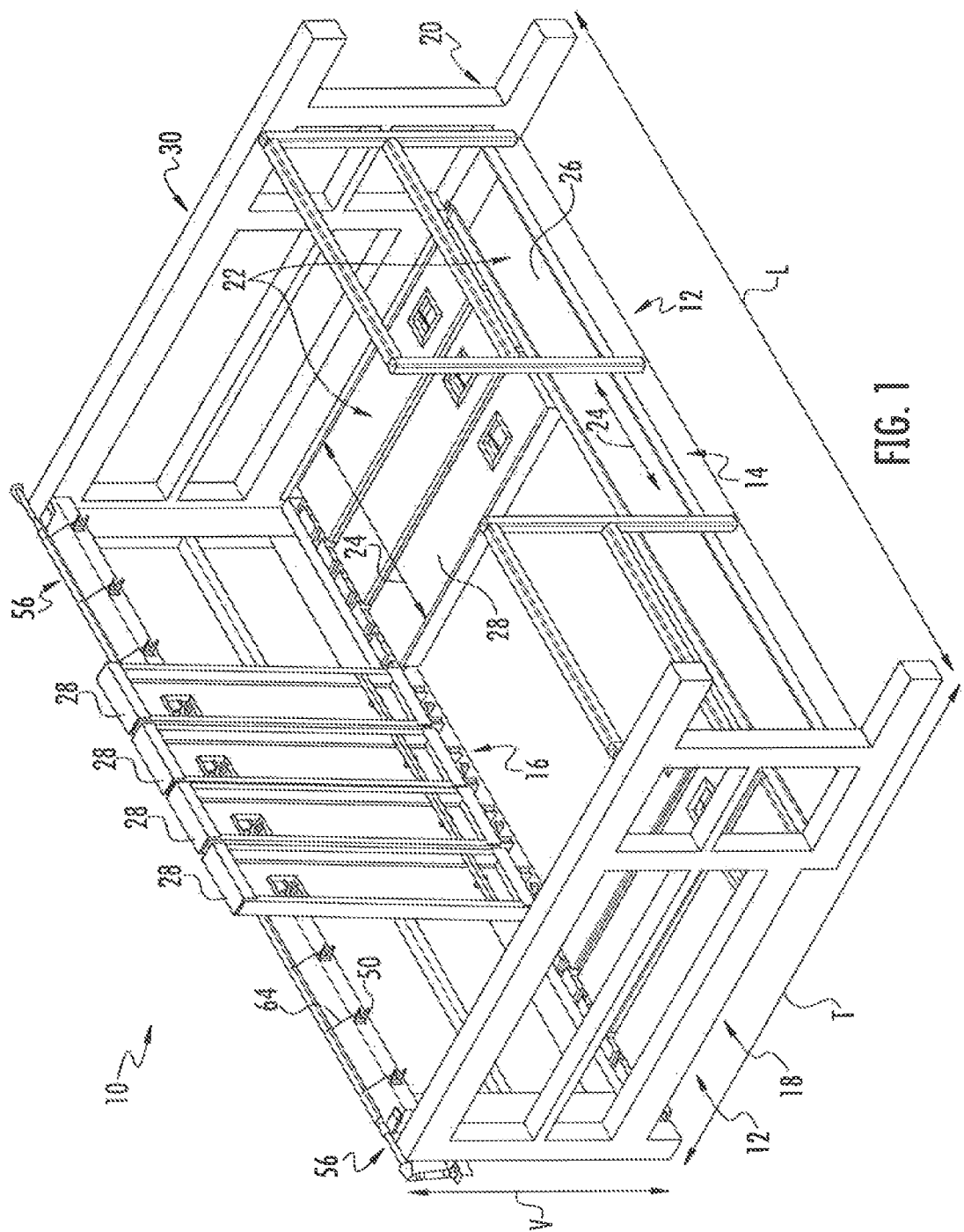
FIG. 1 illustrates a back side perspective view of an exemplary platform safety enclosure according to various embodiments of the present invention.

Reference will now be made in detail to present embodiments of the invention, one or more examples of which are illustrated in the accompanying drawings. The detailed description uses numerical designations to refer to features in the drawings. Like or similar designations in the drawings and description have been used to refer to like or similar parts of the invention. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring now to the drawings, FIG. 1 illustrates a back side perspective view of an exemplary platform safety enclosure 10 according to various embodiments of the present invention. The platform safety enclosure 10 defines a lateral direction. L, a transverse direction T and a vertical direction V where each direction is mutually perpendicular and forms an orthogonal direction system. As shown in FIG. 1, the platform safety enclosure 10 includes a support frame 12. The support frame 12 generally includes a laterally extending inner portion 14, a laterally extending outer portion 16 and a pair of side portions 18, 20 that extend transversely between the inner portion 14 and the outer portion 16 at laterally opposing ends of the support frame 12.

As shown in FIG. 1, a floor portion 22 extends laterally and transversely between the inner portion 14, the outer portion 16 and the side portions 18, 20 of the support frame 12. The floor portion 22 at least partially defines a generally level walking and/or working surface 24 of the platform safety enclosure 10. The floor portion 22 may include one or more floor panels 26. Each floor panel 26 desirably may include anti-skid surface features (not shown), drainage features (not shown) or the like so as to prevent slippage along the working surface 24. Each floor panel 26 may be fixed in position or may be movable.

In particular embodiments, as shown in FIG. 1 for example, the floor portion 22 desirably includes a plurality of access panels 28. Each access panel 28 is configured to be pivotable between an open position and a closed position with respect to the support frame 12. When positioned in a closed position, each access panels 28 extends in the transverse direction T between the inner portion 14 and the outer portion 16 of the support frame 12 and at least partially defines the walking surface 24. Desirably, the plurality of access panels 28 is sufficient in number to cover the entire length (lateral dimension) of the floor portion 22 when arranged side-by-side as shown in FIG. 1 for example. When raised to a fully open position, the access panels 28 extend upwardly in the vertical direction V from the support frame 12 to allow for access through the floor portion 22 of the platform safety enclosure 10.

Figure 2:
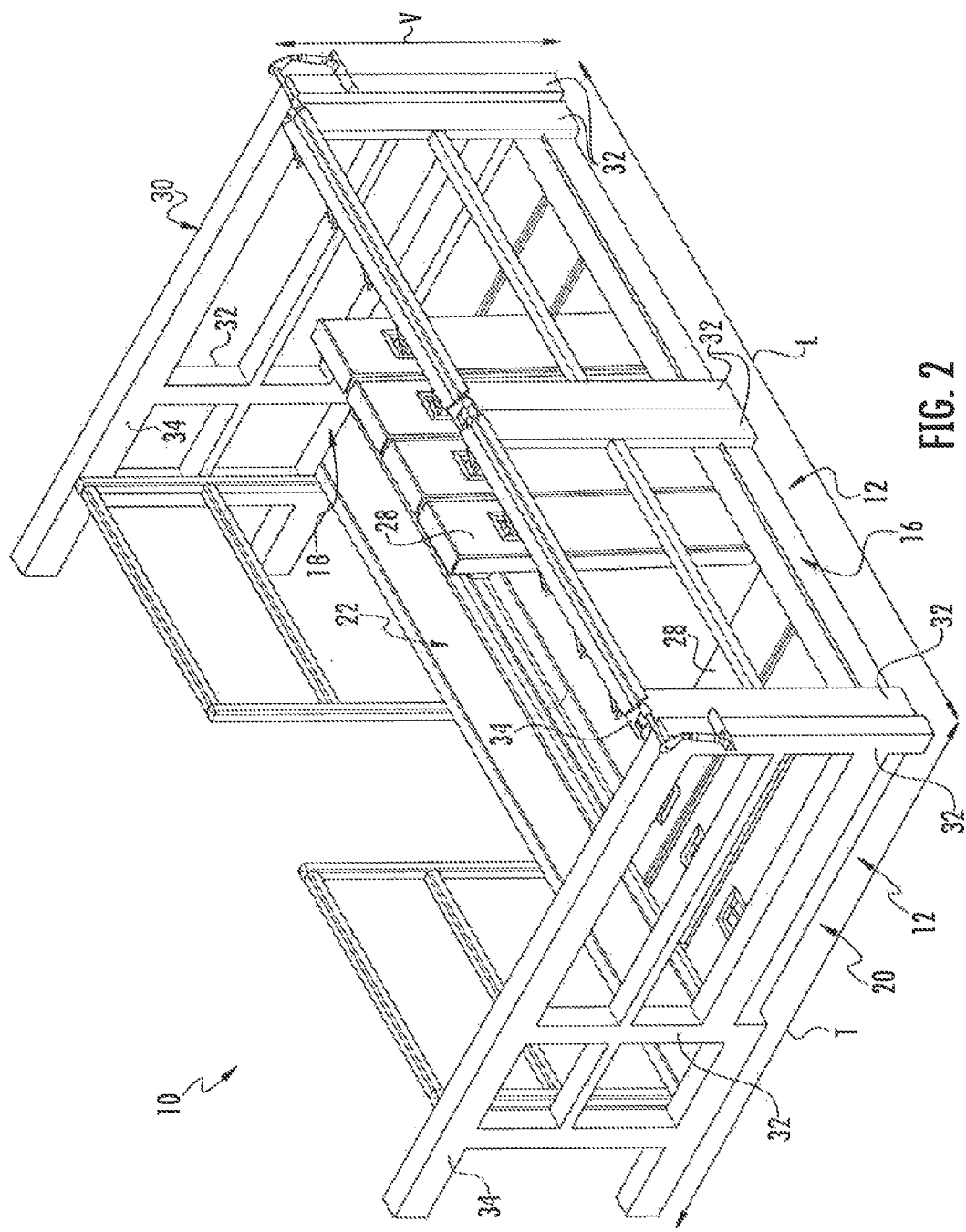
FIG. 2 illustrates a front side perspective view of the platform safety enclosure as shown in FIG. 1.

FIG. 2 illustrates a front side perspective view of the platform safety enclosure 10 as shown in FIG. 1. In one embodiment, as shown in FIGS. 1 and 2, the platform safety enclosure 10 includes a handrail system 30. The handrail system 30 extends at least partially around the floor portion 22 of the platform safety enclosure 10. For example, as shown in FIGS. 1 and 2, the handrail system 30 may extend in the lateral direction L along the outer portion 16 of the support frame 12 and in the transverse direction T along each side portion 18, 20 of the support frame 12. The handrail system 30 may at least partially define the side portions 18, 20 of the support frame 12.

As shown in FIG. 2, the handrail system 30 generally includes one or more supports 32 that extend generally upwardly in the vertical direction V from the support frame 12 and/or the floor portion 22 of the platform safety enclosure 10. A handrail 34 extends between the supports 32 to at least partially define a cage or enclosure. The cage at least partially surrounds the floor portion 22 of the platform safety enclosure 10. As is conventional, the support frame 12, floor portion 22, access panels 28 and handrail system 30 can be made of metal such as steel. However, lighter weight materials such as aluminum or carbon fiber resin matrices might be used.

FIG. 3A illustrates a partial perspective view of components of the platform safety enclosure 10 as shown in FIG. 1, with a portion of the handrail system 30 removed and including five exemplary access panels 28 configured identically according to various embodiments of the present invention. FIG. 3B illustrates an enlarged view of a portion of the platform safety enclosure 10 as circumscribed by line B as shown in FIG. 3A, and FIG. 3C illustrates an enlarged view of a portion of the platform safety enclosure 10 as circumscribed by line C as shown in FIG. 3A. In particular embodiments, as shown in FIG. 3A, each access panel 28 includes a fixed end portion 36 and a free end portion 38. The fixed end portion 36 is pivotally coupled to the support frame 12 so as to be constrained to swing in a relatively smaller arc than the swing arc of the free end portion 38. For example, in one embodiment, as shown in FIG. 3A, the fixed end portion 36 is pivotally coupled to the outer portion 16 of the support frame 12. As shown in FIG. 3A, the free end portion 38 of each access panel 28 desirably is received by and rests against a lip flange 15 carried by the support frame 12 when the access panel 28 is deployed in the closed position to form part of the walking surface 24 of the floor portion 22.

In particular embodiments, as detailed in FIG. 3B, the fixed end portion 36 is pivotally coupled to the support frame 12 via one or more hinge joints 42. Each hinge joint 42 may be at least partially defined by the support frame 12 and partially defined by the access panel 28. As shown in FIG. 3B for example, a pivot pin 40 extends through a respective hinge joint 42. As shown in FIG. 3A, the pivot pins 40 and the hinge joints 42 are positioned so as to be accessible from the walking surface 24 of the floor portion 22 when the access panel 28 is in a fully raised or open position or in an at least partially raised or open position. As a result, an operator and/or repair technician may remove the access panel 28 for repair, replacement and/or disassembly while positioned on the working surface 24, thereby eliminating the need for expensive scaffolding currently required for repair, replacement and/or disassembly of access panels of conventional platform safety enclosures.

A mechanism is provided for restraining each access panel 28 in the open position against the hand rail system 30. In particular embodiments such as shown in FIG. 3A and detailed in FIG. 3C, the platform safety enclosure 10 desirably includes a latch 50 and the access panel 28 includes a latching feature 52 that is attachable and detachable to the latch 50 as selected by the user. In particular embodiments, the platform safety enclosure 10 desirably may include a plurality of latches 50, with one latch 50 being positioned along the hand rail system 30 for each respective access panel 28. The latch 50 may be a spring loaded latch, a magnetic latch or any type of latch suitable for the purpose described herein. In one embodiment, the latch 50 is connected to the handrail system 30. For example, the latch 50 may extend outwardly in the transverse direction or the lateral direction from the handrail 34 toward the interior of the platform safety enclosure 10.

As schematically shown in FIG. 3A and detailed in FIG. 3C, the access panel 28 includes a latching feature 52 that desirably includes a latch pin 54 or the like that is configured to engage with the latch 50 when the access panel 28 is in a fully open position. The latch feature 52 desirably may be disposed proximate to the free end portion 38 of the access panel 28. The latch 50 and the latching feature 52 are configured so that their engagement and disengagement is selectively determined by the user. Suitable latches 50 that selectively grip or release the latch pin 54 at the user's option are available from Stanley-National Hardware of 480 Myrtle Street, New Britain, Conn. 06053.

As schematically shown in FIG. 3A, the user may manually lift an access panel 28 from the closed position, pivot the access panel 28 toward the hand rail system 30 and push the access panel 28 against the handrail 34. In so doing, the user may thrust the latch pin 54 of the latching feature 52 into the grasp of the latch 50 as schematically shown in FIGS. 3A and 3C. Whereupon as schematically shown in FIG. 3C, a retaining detent 51 of the latch 50 prevents movement of the latch pin 54 out of the grasp of the latch 50 and thus holds the access panel 28 in the fully open position against the handrail 34. Each access panel 28 desirably is pivotally mounted with the free end portion 38 disposed slightly off vertical in the direction of the interior of the platform safety enclosure 10 so that in the absence of the latch pin 54 being held in the grasp of a latch 50, the weight of the access panel 28 suffices to move the access panel 28 toward the floor portion 22 under the influence of the force of gravity.

To release the latch pin 54 of the access panel 28 from the grasp of the latch 50 in order to move the access panel 28 away from the open position and the handrail 34 and toward the closed position, the user can tug manually on a release member 64 that retracts the retaining detent 51 of the latch 50, thereby opening the latch 50 and allowing the user manually to move the access panel 28 away from the handrail 34 and eventually to a closed position forming part of the walking surface 24 of the floor portion 22.

Figure 4B:
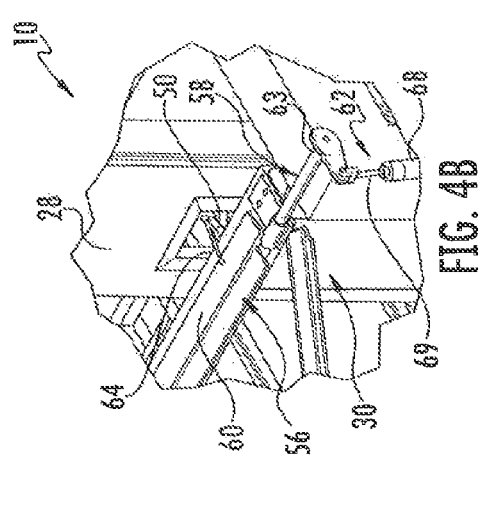
FIG. 4B illustrates an enlarged view of a portion of the platform safety enclosure including a portion of the actuating mechanism in a latched position as circumscribed by line B and as shown in FIG. 4A, according to one embodiment of the present invention.
Figure 4C:
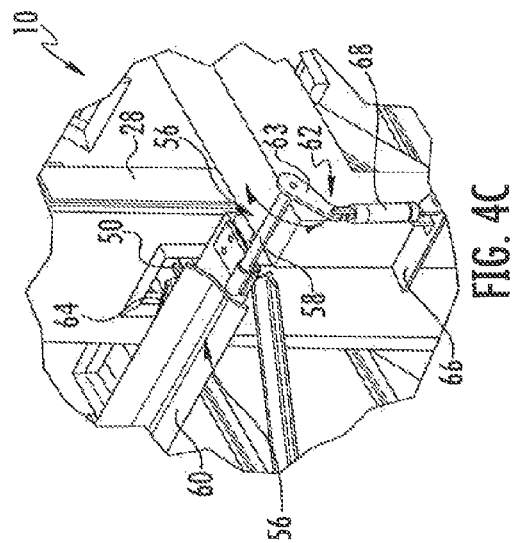
FIG. 4C illustrates an enlarged view of the portion of the platform safety enclosure as shown in FIG. 4B, but with the actuating mechanism in an open or unlatched position.
Figure 4A:
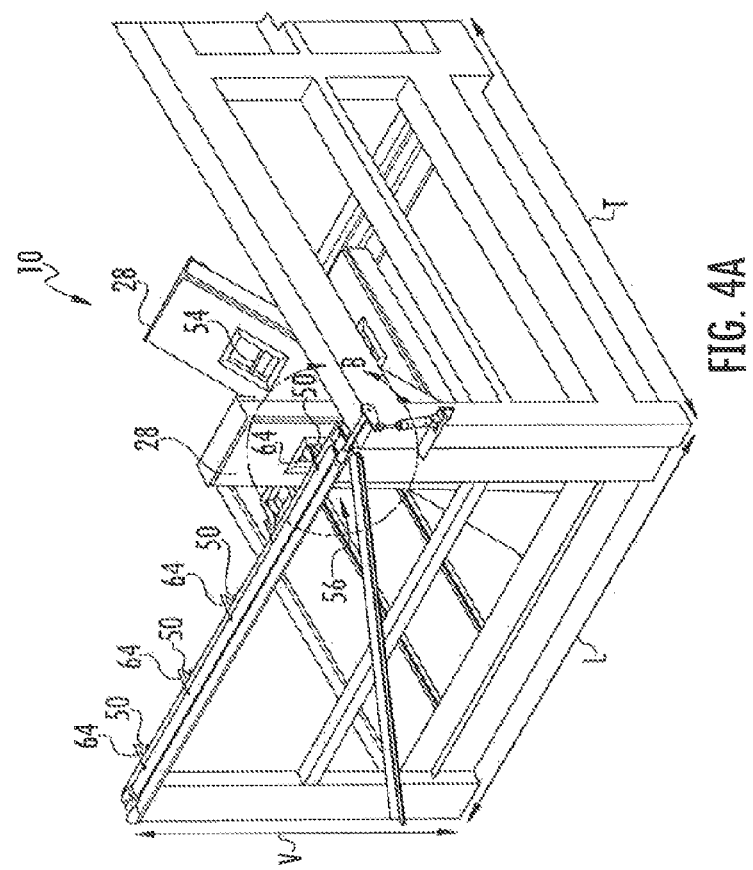
FIG. 4A illustrates a front side partial perspective view of the platform safety enclosure including an actuating mechanism that is coupled to a latch according to one embodiment of the present invention.

However, in accordance with the present invention, a plurality of the access panels 28 can be released simultaneously from their open positions. Moreover, such simultaneous release of a plurality of the access panels 28 that are held in an open position can be performed by the user from a location that is remote from the platform safety enclosure 10. FIG. 4A illustrates a front side partial perspective view of the platform safety enclosure 10 including an actuating mechanism 56 that is coupled to a plurality of latches 50 and is configured to open all of these coupled latches 50 simultaneously according to one embodiment of the present invention. FIG. 4B illustrates an enlarged view of a portion of the platform safety enclosure 10 including a portion of the actuating mechanism 56 when one of the plurality of latches 50 remains in a latched position as circumscribed by line B shown in FIG. 4A. FIG. 4C illustrates an enlarged view of a portion of the platform safety enclosure 10 as shown in FIG. 4B but with the actuating mechanism 56 in an open or unlatched position. The actuating mechanism 56 may be mechanically actuated, electrically actuated, pneumatically actuated or manually actuated according to the selection of the operator.

In one embodiment, as detailed in FIGS. 4B and 4C, the actuating mechanism 56 may include a rotatable rod or shaft 58 that is rotatably coupled to the handrail system 30, a pivot plate 60 that is rigidly connected to the rod 58 and that does not rotate with respect to the rod 58, and a mechanical linkage 62 having one end that is non-rotatably connected to one end of the rod 58. As shown in FIG. 2, the rod 58 and connected pivot plate 60 associated with each mechanical linkage runs down the handrail 34 past a plurality of access panels 28 and associated latches 50. As shown in FIG. 1, the actuating mechanism 56 is coupled mechanically to each latch 50 via a release member 64 such as a rod, wire, chain, rope or the like. In the alternative, the actuating mechanism 56 may be magnetically coupled to each latch 50 that is included in the plurality of latches 50 serviced by the actuating mechanism 56. The actuating mechanism 56 is configured to open each of the plurality of associated latches 50 when the actuating mechanism 56 is engaged or actuated as shown in FIG. 4C, thereby releasing each of the plurality of access panels 28 associated with that actuating mechanism 56. Depending on the number of access panels 28, their sizes and weights, more than one actuating mechanism 56 and associated groupings of a plurality of access panels may be desired for a particular platform safety enclosure 10, and two actuating mechanisms 56 are employed by the embodiment of the platform safety enclosure 10 depicted in FIG. 2 for example.

In one embodiment, as detailed in FIGS. 4B and 4C, the mechanical linkage 62 desirably includes a linkage arm 63 that is rigidly and non-rotatably attached to one end of the rotatable rod 58. The other end of the linkage arm 63 is pivotally connected to one end of an actuator rod 69 of an actuator cylinder 68, which in turn is pivotally connected at one end to a bracket 66. In various embodiments, the actuator 68 may be a pneumatic actuator, a hydraulic actuator, a gas actuator, an electric actuator or the like. Advantageously, the actuator 68 desirably may be remotely actuated, for example, from the ground or a control station.

The bracket 66 desirably is rigidly fixed to a stationary structure such as a wall (not shown) or a stanchion (not shown). In alternate configurations, the second end of the mechanical linkage 62 may be fixed to a stationary object or may be fixed to a chain, wire or other component to allow for manual manipulation of the actuating mechanism 56. As schematically shown in FIG. 4B, when the actuator rod 69 is extended out of the actuator cylinder 68, the linkage arm 63 is held in a horizontal position and the pivot plate 60 of the latching mechanism 56 does not lift the release member 64, and thus the latch 50 is closed and will restrain the latch pin 54 and accordingly restrain the associated access panel 28 in the open orientation against the hand rail system 30. However, as schematically shown in FIG. 4C, when the actuator rod 69 is retracted into the actuator cylinder 68, the linkage arm 63 is tilted below a horizontal position and the pivot plate 60 of the latching mechanism 56 lifts the release member 64, and thus the latch 50 is opened and will release the latch pin 54 and accordingly release the associated access panel 28 from the open orientation against the hand rail system 30 and allow the access panel 28 to move toward the floor portion 22.

At this point in the closing movement operation of the access panel 28, a damper 44, as shown in FIGS. 3A and 3B, acts against the force of gravity and so prevents the heavy access panel 28 from free-falling under the influence of the force of gravity. In one embodiment, as shown in FIGS. 3A and 3B, a damper 44 extends between the support frame 12 and the access panel 28. The damper 44 may be a compression only damper, thereby providing damping and/or resistance only when the damper 44 is in compression, for example, when the access panel 28 is transitioning or pivoting downwardly in the vertical direction V between a fully or partially open position and a closed or partially closed position. As shown in FIGS. 3A and 3B, the damper 44 generally includes a first end 46 that is pivotally coupled to the support frame 12. As shown in FIGS. 3A and 3B, a second end 48 of the damper 44 is generally pivotally coupled to the access panel 28. In one embodiment, the first end 46 of the damper 44 is coupled to the outer portion 16 of the support frame 12. In one embodiment, the second end 48 of the damper 44 is connected to the access panel 28 proximate to the fixed end portion 36.

The damper 44 controls a closure velocity of the access panel 28 when the access panel 28 is transitioning or pivoting downwardly in the vertical direction V between a fully or partially open position and a closed or partially closed position, thereby reducing or preventing bodily harm to any workers who may be positioned beneath the access panel 28 during an accidental or premature closure of the access panel 28. In addition or in the alternative, the damper 44 reduces the momentum of the access panel 28 as it closes. As a result, the force of impact of the access panel 28 against the support frame 12 as the access panel returns to the closed position is reduced, thus preventing or reducing damage to the access panel 28 over time, thereby reducing repair/replacement intervals.

In particular embodiments, the actuating mechanism 56 may be configured to release all open access panels 28 simultaneously. For example, each release member 64 may be coupled to a common portion of the actuating mechanism 56 so that actuation of the actuating mechanism 56 causes each release member 64 to be engaged simultaneously. In this manner, upon operating the actuating mechanism 56 before egressing onto the floor portion 22, an operator may be assured that all access panels 28 are disposed in their closed positions.

Figure 5:
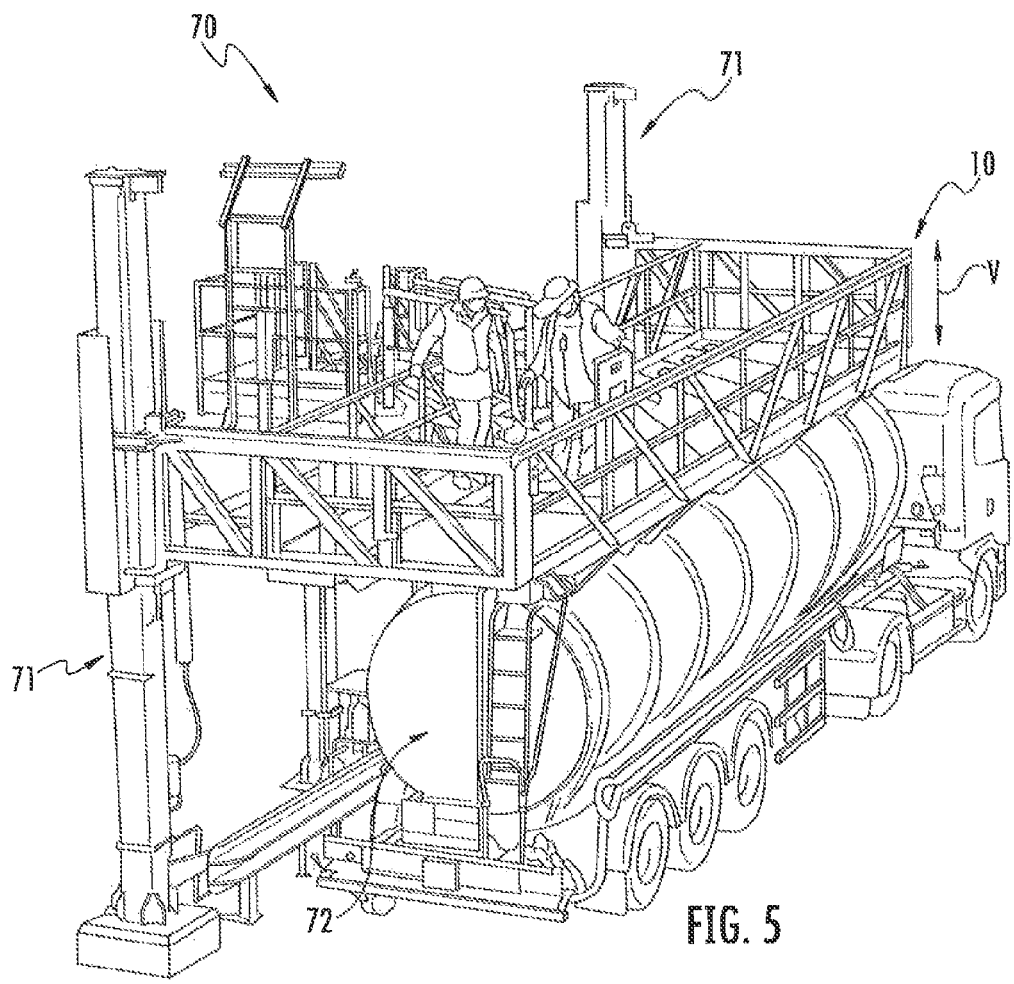
FIG. 5 presents a perspective view that schematically illustrates one embodiment of an elevating platform according to the present invention and including the platform safety enclosure as shown in FIGS. 1 and 2.

FIG. 5 schematically illustrates a perspective view of an elevating platform 70 including the platform safety enclosure 10 according to one embodiment of the present invention. The platform safety enclosure 10 schematically represented in FIG. 5 may be coupled to a vertical lift 71 of the elevating platform 70. In this manner, the platform safety enclosure 10 is carried in the vertical direction V by the vertical lift 70, thereby raising or lowering the platform safety enclosure 10 in order to access manways and/or other equipment such as valves and fittings that are positioned along a top portion of a container vessel 72 such as a tank trailer, a tanker rail car and/or an isotainer.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A platform safety enclosure, comprising:
   a. a support frame having a laterally extending inner portion, a laterally extending outer portion and a pair of transversely extending side portions at laterally opposing ends of said support frame;
   b. a handrail system that extends laterally along said outer portion and transversely along said pair of side portions of said support frame;
   c. a floor portion that extends laterally and transversely across said support frame, said floor portion having an access panel, said access panel including a fixed end portion and an opposing free end portion, said fixed end portion being pivotally coupled to said support frame, wherein said access panel includes a latching feature disposed proximate to said free end portion;
   d. a damper, said damper having a first end coupled to said support frame and a second end coupled to said access panel, wherein said damper controls a closure velocity of said access panel as said access panel pivots from an open position to a closed position; and
   e. a latch connected to said handrail system and extending towards an interior of the platform safety enclosure, wherein said latch retains said access panel via said latching feature when said access panel is in a fully open position and wherein said access panel automatically closes when said latch is opened and said latching feature is disengaged from said latch;
   f. wherein said latch is connected to an actuating mechanism, wherein said actuating mechanism opens said latch and releases said access panel from said latch when said actuating mechanism is actuated, wherein said actuating mechanism comprises a pneumatic actuator connected to a rotatable rod rotatably connected to said handrail system and a mechanical linkage connected to said rotatable rod, wherein said mechanical linkage is connected to said latch.

2. The platform safety enclosure as in claim 1, wherein said damper is a compression only damper.

3. The platform safety enclosure as in claim 1, wherein said damper comprises a first end coupled to said outer portion of said support frame and a second end coupled to said access panel.

4. The platform safety enclosure as in claim 1, wherein said damper comprises a first end coupled to the outer portion of said support frame and a second end coupled proximate to said fixed end portion of said access panel.

5. The platform safety enclosure as in claim 1, wherein said access panel is pivotally coupled to said support frame via a pivot pin that extends through a hinge joint.

6. The platform safety enclosure as in claim 5, wherein said pivot pin is accessible from said floor portion when said access panel is in an at least partially open position.

7. The platform safety enclosure as in claim 1, wherein said latching feature comprises a latch pin.

8. The platform safety enclosure as in claim 1, wherein said fixed end of said access panel is connected to said outer portion of said support frame.

9. An elevating platform, comprising:
   a. a vertical lift mechanism;
   b. a platform safety enclosure carried by said lift mechanism, said platform safety enclosure defining a walking surface, said platform safety enclosure comprising:
      i. a support frame connected to said vertical lift mechanism, said support frame having a laterally extending inner portion, a laterally extending outer portion and a pair of transversely extending side portions at laterally opposing ends of said support frame;
      ii. a handrail system that extends laterally along said outer portion of said support frame;
      iii. a floor portion that extends laterally and transversely across said support frame, said floor portion having an access panel that comprises a fixed end portion and an opposing free end portion, said fixed end portion being pivotally coupled to said support frame, wherein said access panel includes a latching feature disposed proximate to said free end portion;
      iv. a damper, said damper having a first end coupled to said support frame and a second end coupled to said access panel, wherein said damper controls a closure velocity of said access panel as said access panel pivots from an open position to a closed position; and
      v. a latch connected to said handrail system and extending towards an interior of the platform safety enclosure, wherein said latch retains said access panel via said latching feature when said access panel is in a fully open position and wherein said access panel automatically closes when said latch is opened and said latching feature is disengaged from said latch;
      vi. wherein said latch is connected to an actuating mechanism, wherein said actuating mechanism opens said latch and releases said access panel from said latch when said actuating mechanism is actuated, wherein said actuating mechanism comprises a pneumatic actuator connected to a rotatable rod rotatably connected to said handrail system and a mechanical linkage connected to said rotatable rod, wherein said mechanical linkage is connected to said latch.

10. The elevating platform as in claim 9, wherein said damper is a compression only damper.

11. The elevating platform as in claim 9, wherein said damper comprises a first end coupled to the outer portion of said support frame and a second end coupled to said access panel.

12. The elevating platform as in claim 9, wherein said access panel is pivotally coupled to said support frame via a pivot pin.

13. The elevating platform as in claim 12, wherein said pivot pin is accessible from said floor portion when said access panel is in an at least partially open position.

14. The elevating platform as in claim 9, wherein said latching feature comprises a latch pin.

15. The elevating platform as in claim 9, wherein said actuating mechanism further comprises a linkage connected to a stationary object.

16. The elevating platform as in claim 11, wherein said actuating mechanism is acuatable remotely from said interior of said platform safety enclosure.

* * * * *